US007917592B1

(12) United States Patent
Gilbert et al.

(10) Patent No.: US 7,917,592 B1
(45) **Date of Patent: *Mar. 29, 2011**

(54) METHOD FOR GROUPING EXCHANGE 2007 JOURNAL MESSAGES

(75) Inventors: Andrew Gilbert, Downley (GB); Stewart Waldie, Camberley (GB)

(73) Assignee: Symantec Corporation, Mountain View, CA (US)

( * ) Notice: Subject to any disclaimer, the term of this patent is extended or adjusted under 35 U.S.C. 154(b) by 455 days.

This patent is subject to a terminal disclaimer.

(21) Appl. No.: 12/050,333

(22) Filed: Mar. 18, 2008

(51) Int. Cl.
*G06F 15/16* (2006.01)

(52) U.S. Cl. ......................... 709/206; 709/219; 709/224

(58) Field of Classification Search .................. 709/206, 709/219, 224
See application file for complete search history.

(56) References Cited

U.S. PATENT DOCUMENTS 6,330,589 B1 * 12/2001 Kennedy ........................ 709/206
7,237,009 B1 * 6/2007 Fung et al. .................... 709/206
7,552,179 B2 * 6/2009 Jain et al. ...................... 709/206
7,568,008 B2 * 7/2009 Jain et al. ...................... 709/206
7,690,000 B2 * 3/2010 Farmer .......................... 719/318
2007/0038714 A1 * 2/2007 Sell .............................. 709/206
2009/0132779 A1 * 5/2009 Amaki et al. ................. 711/167

OTHER PUBLICATIONS

Get Compliant with Exchange Server 2007 Journaling, Siegfried Jagott, Apr. 1, 2008.*
Gilbert, Andrew, et al., U.S. Appl. No. 12/126,163, filed May 23, 2008, entitled "Method for Grouping Exchange 2007 Journal Messages" (43 pages, 10 shts).

* cited by examiner

*Primary Examiner* — Rupal D Dharia
*Assistant Examiner* — Van Kim T Nguyen
(74) *Attorney, Agent, or Firm* — Gunnison, McKay & Hodgson, L.L.P.; Philip McKay

(57) ABSTRACT

During an initial scan of a journal inbox, journal reports are modified so that the Internet Message ID in the text body appears as a custom message ID value in a new custom message ID MAPI property created on the journal reports. Further, the message class value of the message class MAPI property on the journal reports is modified to a journal part. During a secondary scan of the journal inbox, related journal parts are grouped together based on the custom message ID value. Also, the message class value is modified to prevent the journal reports from being considered in subsequent initial or secondary scans. One of the journal reports of the group is selected as a master copy. A new custom related journal parts MAPI property is created on the master copy that includes a related journal parts value which is a list of identifiers that can be used to locate the other related journal parts of the group.

9 Claims, 8 Drawing Sheets

B 200 (CONT'D)
228
JOURNAL PART TO GROUP ?
NO
YES
230
SELECT JOURNAL PART
232
READ CUSTOM MESSAGE ID
234
MATCH PREVIOUS CUSTOM MESSAGE ID?
NO
GO TO C (FIG. 2D)
YES
236
GROUP ELIGIBLE FLAG =TRUE?
NO
YES
238
MOD TIME < THRESHOLD ?
NO
244
SET GROUP ELIGIBLE FLAG TO FALSE
246
RESET CURRENT SET
YES
240
ADD JOURNAL PART TO CURRENT SET
242
IDENTIFY JOURNAL PART AS THE PREVIOUS JOURNAL PART 200 (CONT'D)
C
248
JOURNAL PART IN CURRENT SET?
NO
YES
SELECT JOURNAL PART
250
MODIFY MESSAGE CLASS
252
NEXT JOURNAL PART IN CURRENT SET?
254
YES
NO
SELECT MASTER COPY
256
CREATE CUSTOM RELATED JOURNAL PARTS MAPI PROPERTY
258
NEXT JOURNAL PART TO GROUP?
260
NO
EXIT
266
YES
SET GROUP ELIGIBLE FLAG TO TRUE
262
RESET CURRENT SET
264
GO TO 230 (FIG. 2C)

300 Journal Report
From: Microsoft Exchange on behalf of SW2007A
Sent: Mon 21/01/2008 14:35
To: SW2007A; SW2007GA; SW2007GB; SW2003AandB; SW2007D
Cc: SW2207B
Subject: Testing (subject)
Message
Testing (Subject) (5 KB)
Sender: SW2007A@EVDEV.LOCAL
Subject: Testing (Subject)
Message-Id: <9FED853B4F673C47A0EB856D582DD77556F1651D5E@VM-EXCH-2007.RESOURCE. EVDEV.LOCAL>
To: SW2007C@EVDEV>LOCAL
To: SW2007D@EVDEV>LOCAL
To: SW2007B@EVDEV>LOCAL
Internet Message ID 302

FIG. 4A

Journal Report MAPI properties 400A 402 406 404 408

| MAPI Property | Type | Value |
| --- | --- | --- |
| PT_MESSAGE_CLASS | PT_STRING | IPM.Note |
| PT_ENTRY_ID | PT_BINARY | Binary blob that can be used to locate the individual item |
| PT_BODY | PT_STRING | Contains information describing the message including the Internet-Message-ID and recipient |
| PT_LAST_MODIFICATION_TIME | PT_SYSTIME | Last modification time |
| x-ms-journal-report | PT_STRING | Empty |

Journal Report MAPI properties 400B 416 414

| MAPI Property | Type | Value |
| --- | --- | --- |
| PT_MESSAGE_CLASS | PT_STRING | IPM.Note.EnterpriseVault.PendingArchive.Part |
| UniqueMessageID | PT_STRING | <9FED853B4F673C47A0EB856D582DD77556F1651D5E@VM-EXCH-2007.RESOURCE. EVDEV.LOCAL> |
| PT_ENTRY_ID | PT_BINARY | Binary blob that can be used to locate the individual item |
| PT_BODY | PT_STRING | Contains information describing the message including the Internet-Message-ID and recipient |
| PT_LAST_MODIFICATION_TIME | PT_SYSTIME | Last modification time |
| x-ms-journal-report | PT_STRING | Empty |

Journal Report MAPI properties 400C

418

| MAPI Property | Type | Value |
|---|---|---|
| PT_MESSAGE_CLASS | PT_STRING | IPM.Note.EnterpriseVault.PendingArchive |
| UniqueMessageID | PT_STRING | <9FED853B4F673C47A0EB856D582DD7 7556F1651D5E@VM-EXCH-2007.RESOURCE.EVDEV. LOCAL> |
| PT_ENTRY_ID | PT_BINARY | Binary blob that can be used to locate the individual item |
| PT_BODY | PT_STRING | Contains information describing the message including the Internet-Message-ID and recipient |
| PT_LAST_MODIFICATION_TIME | PT_SYSTIME | Last modification time |
| x-ms-journal-report | PT_STRING | Empty |

Journal Report "Master Copy" MAPI properties 400D

420

422

| MAPI Property | Type | Value |
|---|---|---|
| PT_MESSAGE_CLASS | PT_STRING | IPM.Note.EnterpriseVault.PendingArchive |
| Related Journal Parts | MULTI-Value PT_BINARY | A list of Exchange Server Entry IDs that identify each of the related Journal Parts. |
| UniqueMessageID | PT_STRING | <9FED853B4F673C47A0EB856D582DD7 7556F1651D5E@VM-EXCH-2007.RESOURCE.EVDEV. LOCAL> |
| PT_ENTRY_ID | PT_BINARY | Binary blob that can be used to locate the individual item |
| PT_BODY | PT_STRING | Contains information describing the message including the Internet-Message-ID and recipient |
| PT_LAST_MODIFICATION_TIME | PT_SYSTIME | Last modification time |
| x-ms-journal-report | PT_STRING | Empty |

432

METHOD FOR GROUPING EXCHANGE 2007 JOURNAL MESSAGES

BACKGROUND OF THE INVENTION

1. Field of the Invention

The present invention relates to the automatic grouping of journal messages associated with electronic mail messages.

2. Description of Related Art

Journaling is the recording of communications, such as electronic mail messages, for retention or archiving purposes. In some instances, journaling is required to comply with regulatory requirements.

Electronic mail (e-mail) journaling applications, such as Microsoft° Exchange Server 2007, can generate several journal messages, called journal reports or envelope journal reports, for each e-mail message that is sent from a mailbox. For example, a journal report can be generated for each different recipient of an e-mail message. Consequently, multiple journal reports related to a single e-mail message can be present in a journal mailbox.

SUMMARY OF THE INVENTION

According to one embodiment, a method for grouping journal messages includes: determining each journal report in an inbox of a journal mailbox to be processed for identification; creating a custom message ID MAPI property on each journal report having an Internet Message ID, the custom message ID MAPI property including a custom message ID value based on the Internet Message ID, and modifying a message class MAPI property on each journal report to reflect a journal part; determining each journal part in the inbox to be processed for grouping; grouping each journal part into a group of related journal parts based on the custom message ID value, each of the journal parts in a group being related based on a same custom message ID value, and modifying the message class MAPI property on each journal part to exclude the journal part from subsequent processing for identification and grouping; selecting a journal part in each group as a master copy for the group; and creating a custom related journal parts MAPI property on each master copy, the custom related journal parts MAPI property including a related journal parts value, wherein the related journal parts value identifies the other related journal reports in the group.

Embodiments in accordance with the invention are best understood by reference to the following detailed description when read in conjunction with the accompanying drawings.

BRIEF DESCRIPTION OF THE DRAWINGS

FIG. 4A illustrates an example of initial journal report MAPI properties of a journal report.

FIG. 4B illustrates an example of the journal report MAPI properties of FIG. 4A modified to include a new custom message ID MAPI property and a modified message class value in accordance with one embodiment of the invention.

FIG. 4C illustrates an example of the journal report MAPI properties of FIG. 4B modified to include a further modified message class value in accordance with one embodiment of the invention.

FIG. 4D illustrates an example of the journal report MAPI properties of FIG. 4C modified to include a new custom related journal parts MAPI property and a further modified message class value in accordance with one embodiment of the invention.

Common reference numerals are used throughout the drawings and detailed description to indicate like elements.

DETAILED DESCRIPTION

Embodiments in accordance with the invention group related journal reports so that the journal reports can be processed at one time, for example, to reduce duplication in compliance or e-discovery applications.

Figure 2A:
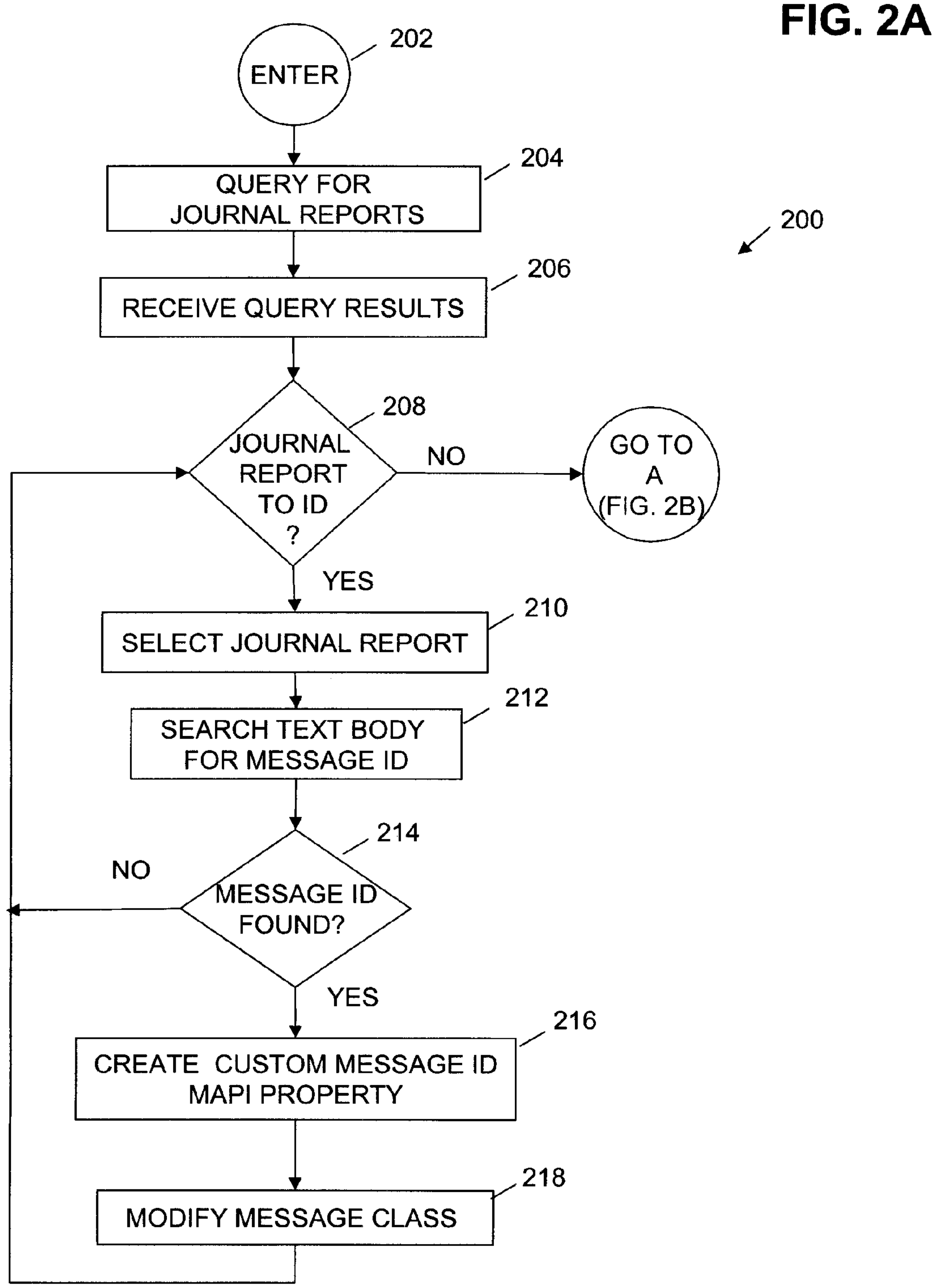
FIGS. 2A-2D illustrate a process flow diagram of a method for grouping journal messages, such as journal reports, in accordance with one embodiment of the invention.

Referring generally to FIG. 2A, in one embodiment, an inbox of a journal mailbox is queried to obtain journal reports to be processed for identification (operation 204). For each journal report identified in a returned response to the query, the journal report is processed to obtain the Internet Message ID, if present, from the text body (operations 206-214).

A custom message ID MAPI property is created on the journal report; and, in one embodiment, the Internet Message ID from the text body of the journal report is used as the custom message ID value for the custom message ID MAPI property (operation 216). Additionally, the message class value of the message class MAPI property of the journal report is modified so that the journal report is excluded from subsequent identification processing of journal reports in the inbox (operation 218). In one embodiment, the message class value of the message class MAPI property is modified to a journal part.

Figure 2B:
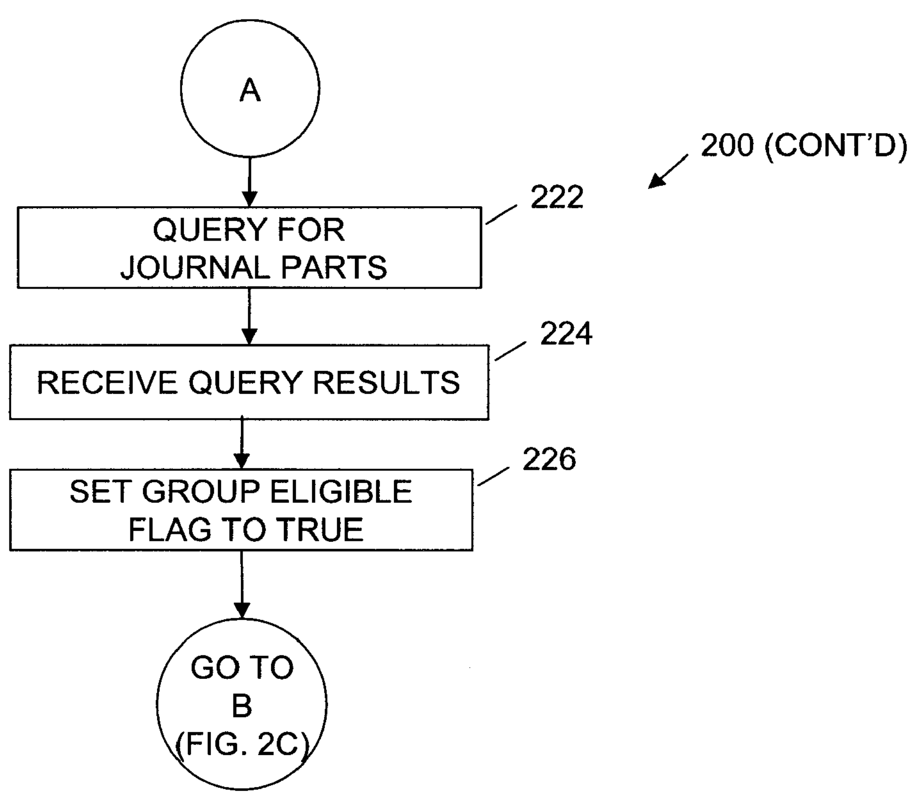
Figure 2C:
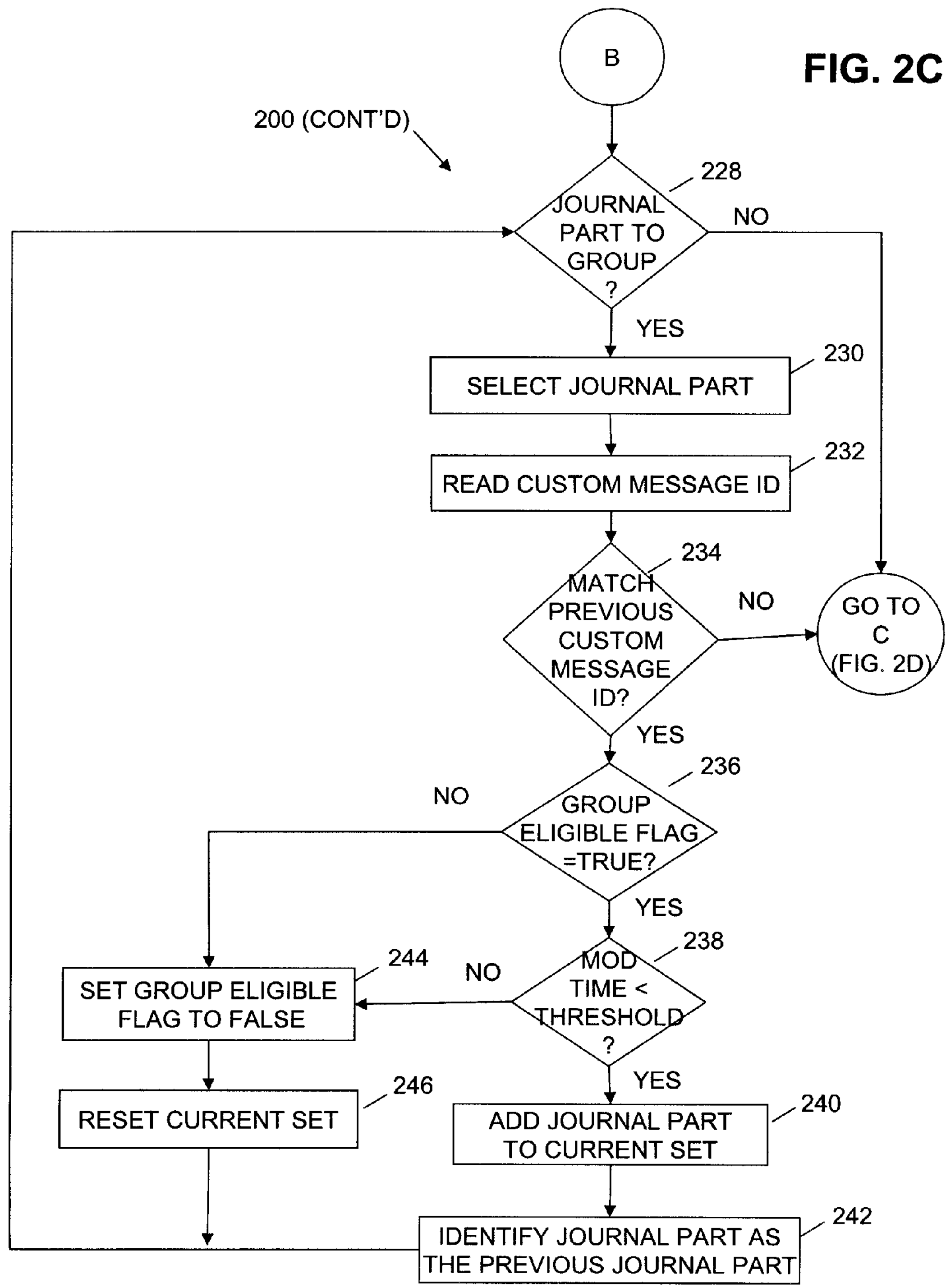

Referring now generally to FIGS. 2B and 2C, the inbox of the journal mailbox is queried to obtain journal parts to be processed for grouping (operation 222). For each journal part identified in the returned response to the query, the journal part is processed for grouping with related journal parts utilizing the custom message ID value. When each journal part in a group of related journal parts has a last modification time before a specified time threshold, the journal parts of that group are deemed ready to group (operation 224-246).

Figure 2D:
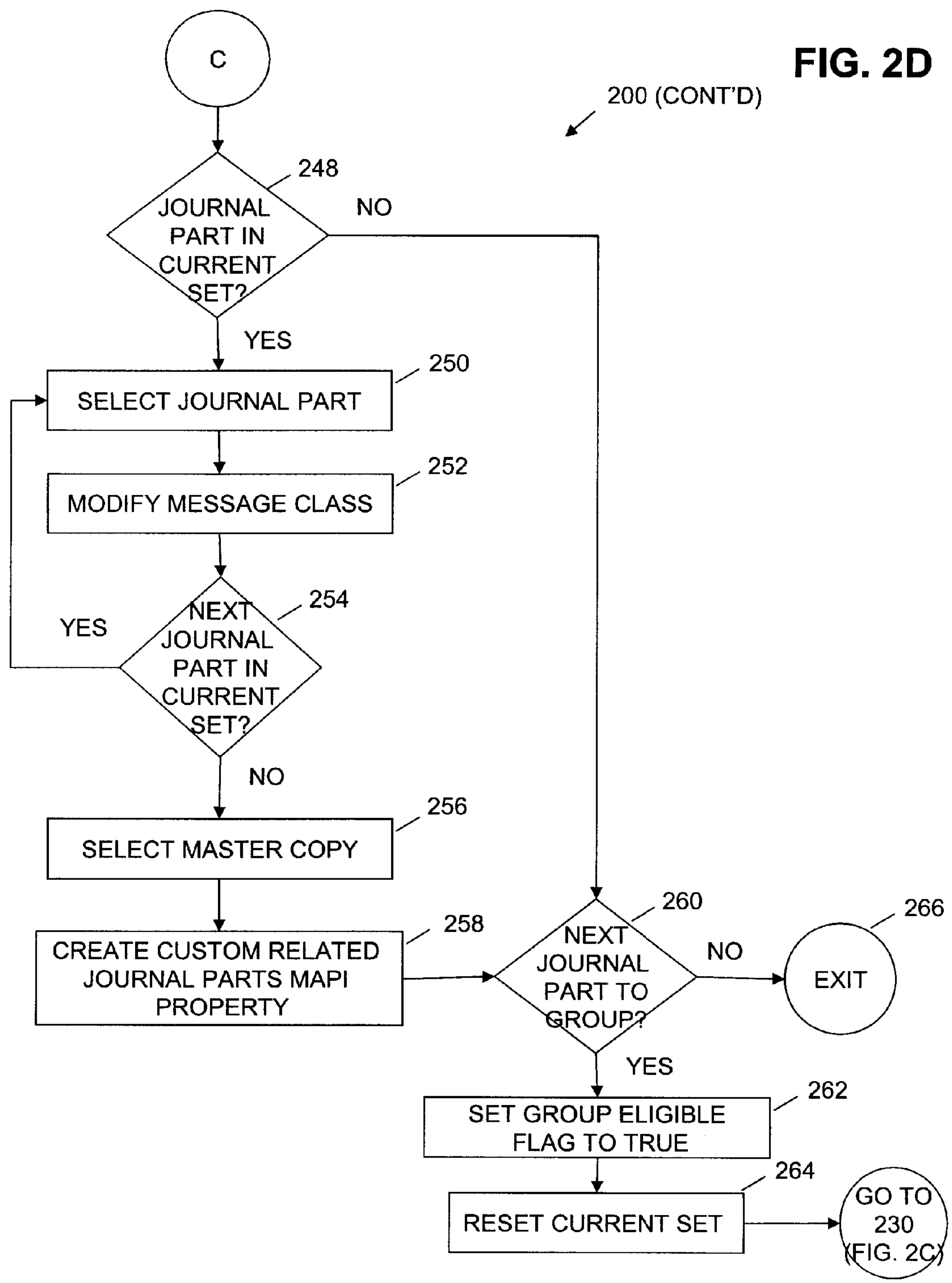

Referring now generally to FIG. 2D, in grouping, the message class value of each journal part in the group is modified so that it is excluded from subsequent identification processing and grouping processing of journal reports in the inbox (operations 248-254). Additionally, one journal part of the group is selected as a master copy and a new custom related journal parts MAPI property is created on the journal part. The custom related journal parts MAPI property includes a related journal parts value which includes a list of identifiers that identify each of the other related journal parts in the group (operations 256-258). Thus, the master copy can serve as a single representative journal report for the group of related journal reports. Accordingly, duplicative processing of the journal reports by applications, such as compliance or e-discovery applications, can be reduced. If so desired, all the related journal reports of the group can be located utilizing the related journal parts value present on the master copy. Grouping of the journal parts continues until all the returned journal parts have been grouped (operations 260-266).

Figure 1:
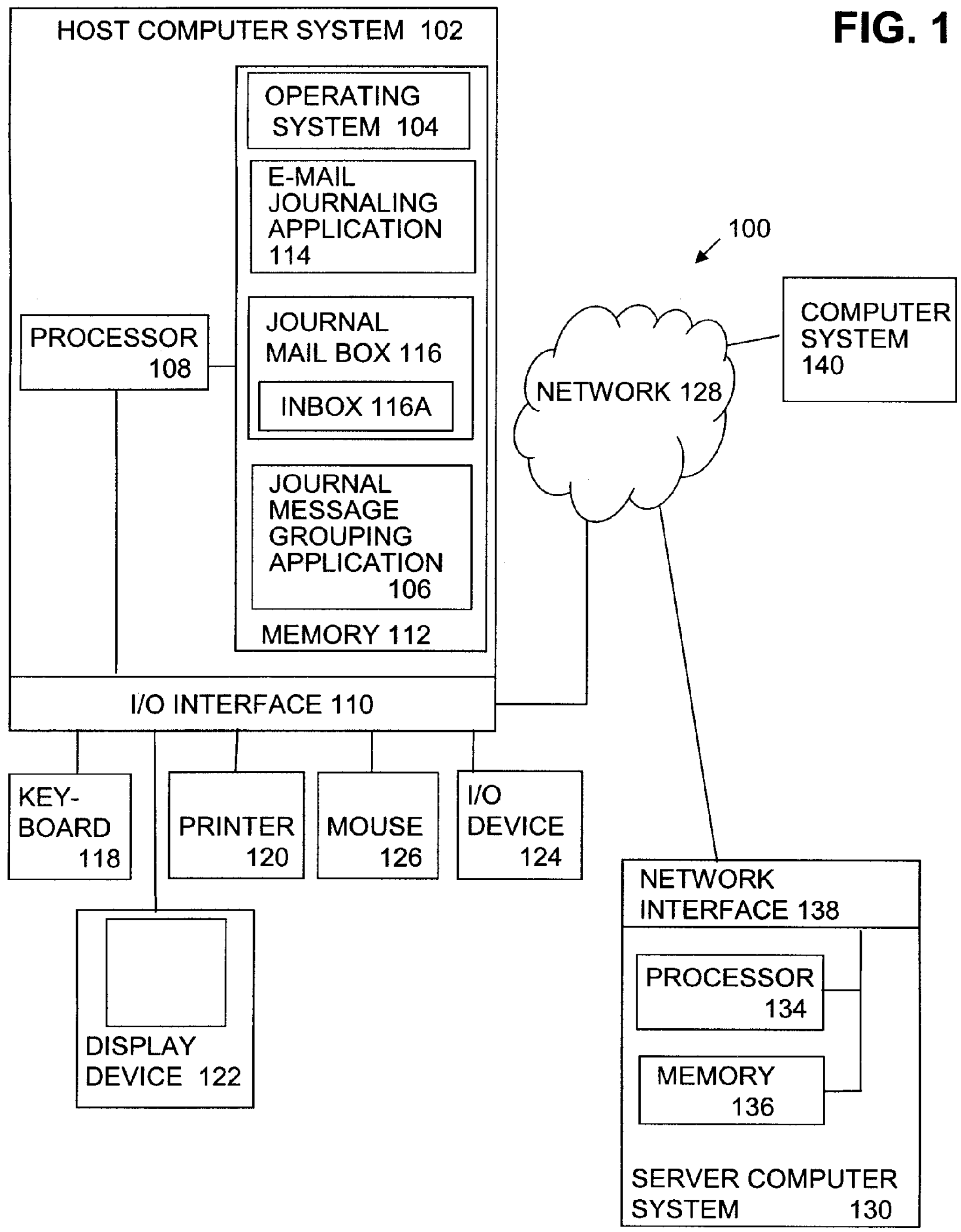
FIG. 1 is a diagram of a computer system including a journal message grouping application executing on a host computer system in accordance with one embodiment of the invention.

Referring more particularly now to FIG. 1, FIG. 1 is a diagram of a computer system 100 including a journal message grouping application 106 executing on a host computer system 102, e.g., a first computer system, in accordance with one embodiment of the present invention. Host computer system 102, sometimes called a client or user device, typically includes a central processing unit (CPU) 108, hereinafter processor 108, an input/output (I/O) interface 110, a memory 112, and an operating system 104. In one embodiment, memory 112 of host computer system 102 further includes an e-mail journaling application 114, such as Microsoft® Exchange Server 2007, and a journal mail box 116 having an inbox 116A for receiving journal messages, such as journal reports. In one embodiment, journal message grouping application 106 is stored in memory 112 of host computer system 102 and executed on host computer system 102.

In one embodiment, memory 112 includes storage media (not shown) for permanent storage of files, sometimes called non-volatile memory, non-temporary storage memory, non-temporary storage media, or permanent storage memory. For example, in one embodiment, the storage media is a hard drive, e.g., a magnetic hard drive, a floppy disk, a CD-ROM, and/or a DVD. Generally, files stored in permanent storage memory, e.g., a magnetic hard disk, a floppy disk, a CD-ROM, a DVD, are unaffected and maintained, i.e., are not lost, upon powering down (turning off) of host computer system 102.

In various embodiments, memory 112 further includes volatile memory for non-permanent storage of files, sometimes called temporary storage memory, non-temporary storage media, or non-permanent storage memory. Generally, files stored in non-permanent storage memory, are lost upon powering down (turning off) of host computer system 102.

Host computer system 102 may further include standard devices like a keyboard 118, a mouse 126, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, journal message grouping application 106 is loaded onto host computer system 102 via I/O device 124, such as from a CD, DVD or floppy disk containing journal message grouping application 106.

In one embodiment, host computer system 102 is coupled to a server computer system 130 of system 100 by a network 128. Server computer system 130 typically includes a processor 134, a memory 136, and a network interface 138.

Host computer system 102 can also be coupled to other computer systems of system 100, such as a computer system 140, by network 128. In one embodiment, computer system 140 is similar to host computer system 102 and, for example, includes a central processing unit, an input output (I/O) interface, and a memory. Computer system 140 may further include standard devices such as a keyboard, a mouse, a printer, a display device and an I/O device(s). The various hardware components of computer system 140 are not illustrated to avoid detracting from the description of the invention.

Network 128 can be any network or network system that is of interest to a user. In various embodiments, network interface 138 and I/O interface 110 include analog modems, digital modems, or a network interface card. The particular type, and configuration, of host computer system 102, computer system 140, and server computer system 130 are not essential to the present invention.

In one embodiment, e-mail journaling application 114, e.g., Microsoft® Exchange Server 2007, supports journaling and generation of journal reports. Typically, in journaling, each e-mail communication sent from host computer system 102 generates one or more journal reports which are sent to a designated mailbox, such as journal mailbox 116. In one embodiment, inbox 116A receives and stores journal messages, such as journal reports. In one embodiment, e-mail journaling application 114 maintains a current time.

Herein a journal report is an item generated as part of the journaling process which records details of an e-mail communication. Journal reports are also known as envelope reports or envelope messages. A journal report is itself an e-mail which is sent to a journal mailbox.

Figure 3:
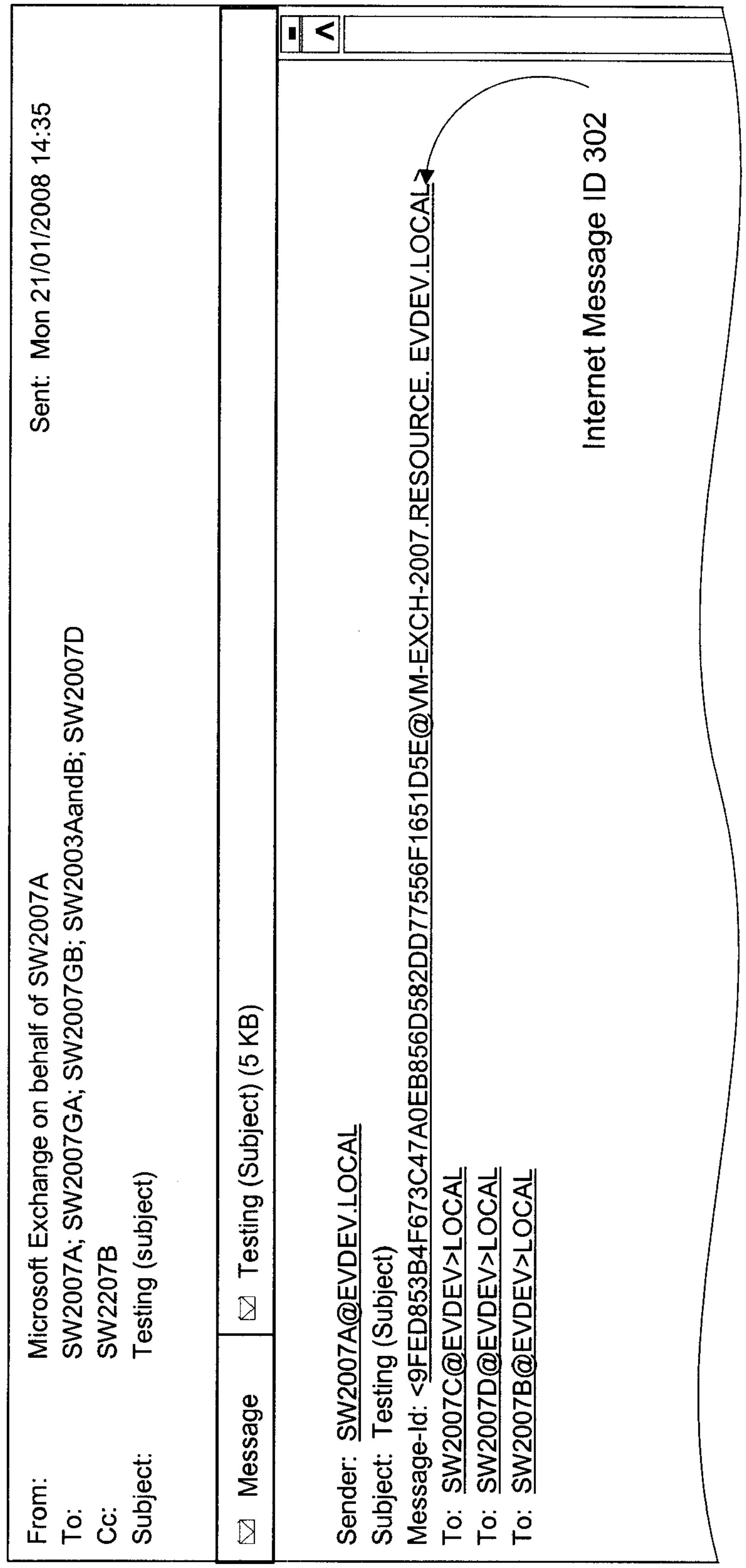
FIG. 3 illustrates an example of a portion of a journal report generated by an e-mail journaling application.

FIG. 3 illustrates an example of a portion of a journal report 300 generated by an e-mail journaling application, such as Microsoft® Exchange Server 2007. Typically, the body of journal report 300 contains information about the sender and the recipients of the e-mail, as well as an Internet Message ID, which is a unique ID that identifies the e-mail. In FIG. 3, the Internet Message ID is shown as Internet Message ID 302. Additionally, the original e-mail communication being reported on is attached to the journal report. In FIG. 3, the attached e-mail communication is indicated as "Testing (Subject) (5K)".

Referring back to FIG. 1, a journal report typically includes a Messaging Application Programming Interface (MAPI) including one or more MAPI properties which is part of the header of the journal report, and thus not usually visible to a reader of the journal report. Applications can utilize the MAPI to access data stored by a journaling application, such as Microsoft® Exchange Server 2007. Applications can also add custom properties to journal messages, such as journal reports, using MAPI.

Conventionally, the Message Class MAPI property indicates the type of journal message. For example, a standard e-mail message has a message class of IPM.NOTE, while a calendar appointment has a message class of IPM.Appointment. A journal report can be identified by the presence of the specific MAPI property, "x-ms-journal-report". An example of some MAPI properties utilized on a conventional journal report is illustrated in FIG. 4A. It can be understood by those of skill in the art that other MAPI properties not shown can also be present, but are not further detailed herein to avoid detracting from the description of the invention.

FIG. 4A illustrates an example of initial journal report MAPI properties 400A of a journal report. In FIG. 4A, initial journal report MAPI properties 400A include a Message Class MAPI property 402 including a message class value 404 of "IPM.NOTE" which indicates a standard e-mail. An ENTRY ID MAPI property 406 includes an entry ID value 408 which is a binary blob that can be used to locate the individual item. The "x-ms-journal-report" MAPI property 410 indicates the journal message is a journal report. A LAST MODIFICATION TIME MAPI property 424 includes a last modification time value 426. The last modification time, i.e., a last modification time value, is initially written to the journal report by e-mail journaling application 114, e.g., Microsoft° Exchange Server 2007, when the journal report is created in the mailbox, e.g., mailbox 116. The last modification time value 426 is then updated automatically by e-mail journaling application 114, e.g., Microsoft° Exchange Server 2007, when the journal report is updated.

FIGS. 2A-2D illustrate a flow diagram of a method 200 for grouping journal messages, such as journal reports, in accordance with one embodiment of the invention. Referring now to FIGS. 1 and 2A together, in one embodiment, execution of journal message grouping application 106 by processor 108 results in the operations of method 200 as described below. In one embodiment, method 200 is entered at an ENTER operation 202 and processing transitions to a QUERY FOR JOURNAL REPORTS operation 204.

In QUERY FOR JOURNAL REPORTS operation 204, a query is generated and sent requesting journal reports present in the journal inbox. This initial query of the inbox, also called herein an initial scan, is to locate journal reports to be processed for identification. For example, in one embodiment, inbox 116A is opened and queried for journal reports. In one embodiment, the query specifies journal reports, and excludes journal parts.

For example, in one embodiment, the query specifies journal messages having a "x-ms-journal-report" MAPI property and excludes journal messages having a message class MAPI property with ".part", e.g., excludes journal parts. As is further detailed herein, excluding journal parts from this initial query prevents returning query results having journal reports already identified in accordance with the invention. From QUERY FOR JOURNAL REPORTS operation 204, processing transitions to a RECEIVE QUERY RESULTS operation 206.

In RECEIVE QUERY RESULTS operation 206, the results of the query of operation 204 are received. For example, in one embodiment, a listing of journal reports in inbox 116A that meet the search criteria, i.e., are not journal parts, is received. Herein in one embodiment, this listing of journal reports is termed a Journal Report listing. From RECEIVE QUERY RESULTS operation 206, processing transitions to a JOURNAL REPORT TO ID check operation 208.

In JOURNAL REPORT TO ID check operation 208, a determination is made whether there is a journal report to process for identification. For example, a determination is made whether the query results, i.e., the Journal Report listing, includes at least one journal report to process for identification.

If there are no journal reports to process ("NO"), processing transitions from JOURNAL REPORT TO ID check operation 208 to a QUERY FOR JOURNAL PARTS operation 222 (FIG. 2B), further described later herein. Alternatively, if there is a journal report to process ("YES"), processing transitions from JOURNAL REPORT TO ID check operation 208 to a SELECT JOURNAL REPORT operation 210.

In SELECT JOURNAL REPORT operation 210, a journal report is selected from the query results to process. Thus, for example, initially, a first journal report from the Journal Report listing is selected for processing. In subsequent processing of remaining journal reports, if any, a next journal report is selected. From SELECT JOURNAL REPORT operation 210 processing transitions to a SEARCH TEXT BODY FOR MESSAGE ID operation 212.

In SEARCH TEXT BODY FOR MESSAGE ID operation 212, the text body of the currently selected journal report is searched for the Internet Message ID. From SEARCH TEXT BODY FOR MESSAGE ID operation 212, processing transitions to a MESSAGE ID FOUND check operation 214.

In MESSAGE ID FOUND check operation 214, a determination is made whether an Internet Message ID is found in the text body of the currently selected journal report. If the Internet Message ID is not found ("NO"), the journal report is considered invalid for identification, and processing returns to JOURNAL REPORT TO ID check operation 208, where a determination is made whether a next journal report to process is present in the Journal Report listing.

Referring back again to MESSAGE ID FOUND check operation 214, alternatively, if an Internet Message ID is found ("YES"), the journal report is valid for identification, and processing transitions from MESSAGE ID FOUND check operation 214 to a CREATE CUSTOM MESSAGE ID MAPI PROPERTY operation 216.

In CREATE CUSTOM MESSAGE ID MAPI PROPERTY operation 216, a new custom message ID MAPI property is created on the journal report. In one embodiment, the custom message ID MAPI property includes the Internet Message ID of the currently selected journal report as the custom message ID value.

More particularly, the custom message ID MAPI property has a custom message ID field which includes the Internet Message ID of the currently selected journal report as the custom message ID value in the field. In this way, the Internet Message ID, which is internal to the journal report, is now promoted to a MAPI property on the journal report that can be later used for grouping related journal reports. From CREATE CUSTOM MESSAGE ID MAPI PROPERTY operation 216, processing transitions to a MODIFY MESSAGE CLASS operation 218.

In MODIFY MESSAGE CLASS operation 218, the message class value of the message class MAPI property of the journal report is modified to exclude the journal report from subsequent processing for identification. In one embodiment, the message class value of the message class MAPI property is modified to a journal part. By modifying the message class to journal part, e.g., to include ".part", the journal report will not be returned in subsequent initial scan queries of inbox 116A for journal reports, as journal parts are excluded in the initial scan query of operation 204. This prevents the same journal report from being reprocessed. From MODIFY MESSAGE CLASS operation 218, processing transitions to JOURNAL REPORT TO ID check operation 208, as earlier described.

FIG. 4B illustrates an example of the journal report MAPI properties of FIG. 4A modified to include a new custom message ID MAPI property and a modified message class value in accordance with one embodiment of the invention. In FIG. 4B, in one embodiment, following operations 216, 218, the initial journal report MAPI properties 400A of FIG. 4A are as shown in Journal Report MAPI properties 400B of FIG. 4B.

Journal Report MAPI properties 400B includes a new custom message ID MAPI property 412 "UniqueMessageID" of type "PR_STRING" including a custom message ID value 414 of "<9FED853B4F673C47A0EB856D582DD77556F1651D5E@VM-EXCH-2007.RESOURCE.EVDEV.LOCAL>", which, for purposes of example, is the Internet Message ID from the body of the journal report, e.g., Internet message ID 302 (FIG. 3). Those of skill in the art can recognize that although "UniqueMessageID" is used in the example to identify custom message ID MAPI property 412, in other embodiments, identifiers other than "UniqueMessageID" can be used.

Additionally, the initial message class value 404 "IPM.Note" of FIG. 4A is now modified as shown in FIG. 4B to the message class value 416 of "IPM.Note.EnterpriseVault.PendingArchive.Part", a journal part. Also, as the journal report has been modified, the last modification time 426 of FIG. 4A is automatically modified by e-mail journaling application 114 to reflect an updated last modification time 428. Thus in FIG. 4B, the journal report now includes a custom message ID value and is identified as a journal part, and has an updated last modification time 428 indicating the time it was processed in the initial scan. The journal report has now been processed for identification as previously described.

Referring back again to FIG. 2A, the above operations, e.g., operations 208-218, are repeated until there are no journal reports present in the query results, e.g., in the Journal Report listing, to process. Thus, at JOURNAL REPORT TO ID check operation 208, when no journal reports are present to process ("NO"), the processed journal reports present in inbox 116A each now has a new custom message ID value identifying an associated Internet Message ID and a message class value identifying the journal report as a journal part. Subsequently, the custom message ID value can be used to group related journal parts.

In one embodiment, following the completion of the identification of the returned journal reports in inbox 116A, grouping of related journal parts is automatically begun as further described herein. However, in other embodiments, repeated identification processing of journal reports in inbox 116A can be performed, for example, such as when there are very few journal reports, prior to initiating the grouping processing. For example, identification processing of journal reports in inbox 116A can be performed repeatedly until a specified journal report count is reached, or until a specified time period is reached.

Referring now to FIG. 2B, in one embodiment, subsequent to completion of the identification processing described with reference to FIG. 2A, grouping of related journal reports, which are now journal parts, is automatically performed as further described herein. Thus, in one embodiment, when there are no more journal reports in the Journal Report listing to process ("NO"), from JOURNAL REPORT TO ID check operation 208 (FIG. 2A), processing transitions to QUERY FOR JOURNAL PARTS operation 222.

In QUERY FOR JOURNAL PARTS operation 222, the inbox of the journal mailbox is queried for journal parts. This second query of the inbox, also called herein a secondary scan, is to locate related journal reports to group. For example, in one embodiment, inbox 116A is opened and queried for journal parts.

More particularly, in one embodiment, inbox 116A is queried for a result listing each journal part present in inbox 116A having a message class value that is a journal part, e.g., ".part". Further, in one embodiment, the query also specifies that the search be sorted by the custom message ID value. From QUERY FOR JOURNAL PARTS operation 222, processing transitions to a RECEIVE QUERY RESULTS operation 224.

In RECEIVE QUERY RESULTS operation 224, the results of the query of operation 222 are received. For example, in one embodiment, a listing of journal parts in inbox 116A that meet the search criteria, i.e., are journal parts, is received. Herein in one embodiment, this listing of journal parts is termed a Journal Part listing. Further, in one embodiment, the Journal Part listing is sorted by the custom message ID. From RECEIVE QUERY RESULTS operation 224, processing transitions to a SET GROUP ELIGIBLE FLAG TO TRUE operation 226.

In SET GROUP ELIGIBLE FLAG TO TRUE operation 226, a group eligible flag maintained and utilized by journal message grouping application 106 is set to true. In one embodiment, the group eligible flag is stored in a memory structure of journal message grouping application 106, such as in a temporary memory structure. In other embodiments, the group eligible flag is stored in a memory structure accessible by journal message grouping application 106, such as in a memory structure located on host computer system 102.

In one embodiment, the group eligible flag is used to optimize processing when an ineligible journal part is found, so that other journal parts with the same ID are not examined. In one embodiment, the group eligible flag is initially set to a default setting of true, for example, a value of 0. From SET GROUP ELIGIBLE FLAG TO TRUE operation 226, processing transitions to a JOURNAL PART TO GROUP check operation 228 (FIG. 2C).

Referring now to FIG. 2C, in JOURNAL PART TO GROUP check operation 228, a determination is made whether there is a journal part to process for grouping. For example, a determination is made whether the query results, i.e., the Journal Part listing, includes at least one journal part to process for grouping. If there are no journal parts to process for grouping ("NO"), processing transitions from JOURNAL PART TO GROUP check operation 228 to a JOURNAL PART IN CURRENT SET check operation 248 (FIG. 2D), further described later herein. Alternatively, if there is a journal part to process for grouping ("YES"), processing transitions from JOURNAL PART TO GROUP check operation 228 to a SELECT JOURNAL PART operation 230.

In SELECT JOURNAL PART operation 230, a journal part is selected from the query results to process. Thus, for example, initially, a first journal part from the Journal Part listing is selected. In subsequent processing of remaining journal parts, if any, a next journal part is selected. From SELECT JOURNAL PART operation 230, processing transitions to a READ CUSTOM MESSAGE ID operation 232.

In READ CUSTOM MESSAGE ID operation 232, the custom message ID value of the custom message ID MAPI property of the journal part is read. From READ CUSTOM MESSAGE ID operation 232, processing transitions to a MATCH PREVIOUS CUSTOM MESSAGE ID check operation 234.

In MATCH PREVIOUS CUSTOM MESSAGE ID check operation 234, a determination is made whether the custom message ID value read in operation 232 matches a previous custom message ID value. Initially, a previous custom message ID value is not present as no journal parts have been processed. If there is no previous custom message ID value, the custom message ID value of the currently selected journal part does not match.

In subsequent operations, in which a previous custom message ID value is present, when the custom message ID value of the currently selected journal part matches the previous custom message ID value, it is assumed the currently selected journal part is related to the previous journal part and is therefore part of a same group associated with the same e-mail. Alternatively, in subsequent operations, where there is not a match, it is assumed the currently selected journal part is not related to the same message group as the previous journal part.

Thus, if the custom message ID value of the currently selected journal part does not match the previous custom message ID value ("NO"), from MATCH PREVIOUS MESSAGE ID check operation 234, processing transitions to a JOURNAL PART IN CURRENT SET check operation 248 of FIG. 2D further described later herein. Alternatively, if the custom message ID value of the currently selected journal part matches the previous custom message ID value ("YES"), from MATCH PREVIOUS CUSTOM MESSAGE ID check operation 234, processing transitions to a GROUP ELIGIBLE FLAG=TRUE check operation 236.

In GROUP ELIGIBLE FLAG=TRUE check operation 236, a determination is made whether the group eligible flag is set to true. If the group eligible flag is not set to true ("NO"), the group is not mature enough to be grouped, and processing transitions from GROUP ELIGIBLE FLAG=TRUE check operation 236 to a SET GROUP ELIGIBLE FLAG TO FALSE operation 244.

In SET GROUP ELIGIBLE FLAG TO FALSE operation 244, the group eligible flag is set to false. From SET GROUP ELIGIBLE FLAG TO FALSE operation 244, processing transitions to a RESET CURRENT SET operation 246.

In RESET CURRENT SET operation 246, the Current Set is reset. More particularly, the Current Set listing is cleared to begin building a different Current Set. From RESET CURRENT SET operation 246, processing transitions and returns to JOURNAL PART TO GROUP check operation 228 and a determination is made whether there is a journal part in the Journal Part listing to be processed for grouping, e.g., a next journal part to be processed for grouping, as earlier described.

Referring back again to GROUP ELIGIBLE FLAG=TRUE check operation 236, alternatively, if the group eligible flag is set to true ("YES"), from GROUP ELIGIBLE FLAG=TRUE check operation 236, processing transitions to a MOD TIME<THRESHOLD check operation 238.

In MOD TIME<THRESHOLD check operation 238, a determination is made whether a last modification time value of LAST MODIFICATION TIME MAPI property 242 of the currently selected journal part is before a specified time threshold. In one embodiment, the time threshold, i.e., a time threshold value, is calculated by reading the current time from e-mail journaling application 114, e.g., Microsoft° Exchange Server 2007, and then subtracting a delay value. In one embodiment the delay value is represented in minutes. In one embodiment, the delay value is configurable, and includes a default delay value, such as 5 minutes. Thus for example, if the current time is 2:30 PM and the delay value is 5 minutes, the time threshold is 2:25 PM.

For example, in one embodiment the last modification time value of the journal part is compared against the specified time threshold. If the last modification time value of the journal part is before or equal to the calculated time threshold, the journal part qualifies as being ready for grouping, otherwise the journal part is too recent and does not qualify for grouping. In one embodiment, when a journal report fails to qualify for grouping due to its age, any other possible members of the group are also disqualified.

As the last modification time value is updated automatically when a journal report is modified, in one embodiment, the last modification time value records the time the journal report was processed for identification. Thus, in one embodiment, last modification time value 428 (FIG. 4B) is compared against the time threshold. In one embodiment, when the last modification time value of the currently selected journal part is not before the time threshold ("NO"), the group is not mature enough to be grouped, and processing transitions from MOD TIME<THRESHOLD check operation 238 to SET GROUP ELIGIBLE FLAG TO FALSE operation 244, earlier described. Alternatively, if the last modification time value of the currently selected journal part is before the time threshold ("YES"), from MOD TIME<THRESHOLD check operation 238 processing transitions to an ADD JOURNAL PART TO CURRENT SET operation 240.

In ADD JOURNAL PART TO CURRENT SET operation 240, the currently selected journal part is added to the Current Set. Herein a Current Set is a listing of a group of related journal parts. In one embodiment, the Current Set is stored in a memory structure of journal message grouping application 106, such as in a temporary memory structure. In other embodiments, the Current Set is stored in a memory structure accessible by journal message grouping application 106, such as in a memory structure located on host computer system 102.

Thus, each journal part selected in operation 240 for addition to this Current Set is part of a group having the same custom message ID and having a last modification time value before the time threshold. From ADD JOURNAL PART TO CURRENT SET operation 240, processing transitions to an IDENTIFY JOURNAL PART AS THE PREVIOUS JOURNAL PART operation 242.

In IDENTIFY JOURNAL PART AS THE PREVIOUS JOURNAL PART operation 242, one or more parameters of the currently selected journal part are identified as the previous journal part. In one embodiment, the previous journal part is stored in a memory structure of journal message grouping application 106, such as in a temporary memory structure. In other embodiments, the previous journal part is stored in a memory structure accessible by journal message grouping application 106, such as in a memory structure located on host computer system 102.

Storing the previous journal part information allows journal message grouping application 106 to "remember" the attributes of the most recently processed journal report for later comparison in check operation 234. In particular, in one embodiment, the custom message ID value of the currently selected journal part is stored as the previous custom message ID value. From IDENTIFY JOURNAL PART AS THE PREVIOUS JOURNAL PART operation 242, processing transitions t and returns to JOURNAL PART TO GROUP check operation 228 and a determination is made whether there is a journal part in the Journal Part listing to be processed for grouping, e.g., a next journal part to be processed for grouping.

Referring now to FIG. 2D, in JOURNAL PART IN CURRENT SET check operation 248, a determination is made whether there is a journal part present in the Current Set listing to process. If there is no journal part present in the Current Set listing to process ("NO"), processing transitions from JOURNAL PART IN CURRENT SET check operation 248 to a NEXT JOURNAL PART TO GROUP check operation 260 further described later herein. Alternatively, if there is a journal part present in the Current Set listing to process ("YES"), processing transitions from JOURNAL PART IN CURRENT SET check operation 248 to a SELECT JOURNAL PART operation 250.

In SELECT JOURNAL PART operation 250, a journal part in the Current Set listing is selected for processing. Thus, for example, initially, a first journal part in the Current Set listing is selected. In subsequent processing of remaining journal parts in the Current Set, if any, a next journal part in the Current Set is selected for processing. From SELECT JOURNAL PART operation 250, processing transitions to a MODIFY MESSAGE CLASS operation 252.

In MODIFY MESSAGE CLASS operation 252, the message class value of the selected journal part in the Current Set is modified to prevent reprocessing. In one embodiment, the message class value is modified to prevent reprocessing for identification and to prevent reprocessing for grouping.

FIG. 4C illustrates an example of the journal report MAPI properties of FIG. 4B modified to include a further modified message class value in accordance with one embodiment of the invention. In FIG. 4C, in one embodiment, following operation 252, the message class value 416 "IPM.Note.EnterpriseVault.Pending Archive.Part" of FIG. 4B is now modified to message class value 418 "IPM.Note.EnterpriseVault.Pending Archive" shown in FIG. 4C. Thus in FIG. 4C, the journal part in the Current Set would not be returned in response to the query of operation 204 (FIG. 2A) or of operation 222 (FIG. 2B). Also, as the journal report has been modified, the last modification time 428 of FIG. 4B is automatically modified by e-mail journaling application 114 to reflect an updated last modification time 430. From MODIFY MESSAGE CLASS operation 252, processing transitions to a NEXT JOURNAL PART IN CURRENT SET check operation 254.

In NEXT JOURNAL PART IN CURRENT SET check operation 254, a determination is made whether there is a next journal part in the Current Set to process. In one embodiment, if there is a next journal part in the Current Set listing to process ("YES"), processing transitions and returns to SELECT JOURNAL PART operation 250, earlier described. Alternatively, if there is not a next journal part in the Current Set to process ("NO"), from NEXT JOURNAL PART IN CURRENT SET check operation 254, processing transitions to a SELECT MASTER COPY operation 256.

In SELECT MASTER COPY operation 256, one of the journal parts in the Current Set is selected for designation as a master copy. For example, in one embodiment, the last journal part processed in the Current Set is selected for designation as the master copy. In other embodiments, a different journal part in the Current Set can be selected. From SELECT MASTER COPY operation 256, processing transitions to a CREATE CUSTOM RELATED JOURNAL PARTS MAPI PROPERTY operation 258.

In CREATE CUSTOM RELATED JOURNAL PARTS MAPI PROPERTY operation 258, a new custom related journal parts MAPI property is created on the journal part selected as the master copy in operation 256. In one embodiment, the custom related journal parts MAPI property includes a related journal parts MAPI field including a related journal parts value.

In one embodiment, the related journal parts value is a multi-value binary property that is a list of identifiers that identify each of the related Journal Parts in the group. In one embodiment, the related journal parts value is a list of Exchange Server Entry IDs that identity each of the related Journal Parts in the group, e.g., in the Current Set. Exchange Server Entry IDs are well known to those of skill in the art and not further described herein to avoid detracting from the description of the invention. In this way, the related journal parts value can be used to access the other related journal parts if needed.

FIG. 4D illustrates an example of the journal report MAPI properties of FIG. 4C modified to include a new related journal parts MAPI property and a further modified message class value in accordance with one embodiment of the invention. In FIG. 4D, in one embodiment, following operation 258, the journal report MAPI properties 400C of FIG. 4C for the journal part selected as the master copy are as shown in Journal Report MAPI properties 400D of FIG. 4D. Journal Report MAPI properties 400D has a new custom Related Journal Parts MAPI property 420 "Related Journal Parts" of type "MULTI-Value PT_BINARY" including a related journal parts value 422 which is, in one embodiment, a list of Exchange Server Entry IDs that identify each of the related journal parts of the group. Also, as the journal report has been modified, the last modification time 430 of FIG. 4C is automatically modified by e-mail journaling application 114 to reflect an updated last modification time 432.

In subsequent processing, if any, the master copy can be used as a single journal report reference to an e-mail, and each of the related journal parts does not have to be duplicatively processed. However, if so desired, the other related journal parts can be accessed utilizing the related journal parts value on the master copy. From CREATE CUSTOM RELATED JOURNAL PARTS MAPI PROPERTY operation 258, processing transitions to NEXT JOURNAL PART TO GROUP check operation 260.

In NEXT JOURNAL PART TO GROUP check operation 260, a determination is made whether there is a remaining journal part, e.g., a next journal part, to process for grouping in the Journal Part listing. If there is a next journal part to process ("YES"), from NEXT JOURNAL PART TO GROUP check operation 260, processing transitions to a SET GROUP ELIGIBLE FLAG TO TRUE operation 262.

In SET GROUP ELIGIBLE FLAG TO TRUE operation 262, the group eligible flag is set to true and processing transitions from SET GROUP ELIGIBLE FLAG TO TRUE operation 262 to a RESET CURRENT SET operation 264.

In RESET CURRENT SET operation 264, the Current Set is reset. In one embodiment, resetting the Current Set deletes any journal parts from the listing of the Current Set. From RESET CURRENT SET operation 264, processing transitions to SELECT JOURNAL PART operation 230 (FIG. 2C) with a next journal part in the Journal Part listing being selected for grouping as earlier described.

Referring back again to NEXT JOURNAL PART TO GROUP check operation 260, alternatively, if there is no remaining journal part in the Journal Part listing to process for grouping ("NO"), processing exits method 200 at an EXIT operation 266, or optionally returns to operation 204 (FIG. 2A).

The above embodiment has been described to allow subsequent processing of the grouped journal parts, such as by compliance or e-discovery applications or another selected application. However, in an alternate embodiment, the journal parts in the Current Set can be further processed by another application during processing of the Current Set.

For example in one alternate embodiment, subsequent to operation 250, each journal part can be processed in accordance with a specified method (not shown), such as a compliance or e-discovery application, and following the specified method, processing returned to operation 252. As another example, in another alternate embodiment, subsequent to operation 256 or operation 258, the master copy journal part can be processed in accordance with a specified method, and following the specified method, processing returned to operation 258, or check operation 260, respectively.

Referring again to FIG. 1, in one embodiment of the invention, journal message grouping application 106 is in memory 112. As used herein, a computer memory refers to a volatile memory, a non-volatile memory, or a combination of the two.

Although journal message grouping application 106 is referred to as an application, this is illustrative only. Journal message grouping application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

Embodiments in accordance with the present invention may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM disks, DVDs, ROM cards, floppy disks, magnetic tapes, computer hard drives, and servers on a network. In another embodiment, a computer program product comprises a tangible storage medium configured to store computer readable code including CD-ROM disks, DVDs, ROM cards, floppy disks, magnetic tapes, computer hard drives, and servers on a network.

As illustrated in FIG. 1, this medium may belong to the computer system itself. However, the medium also may be removed from the computer system. For example, journal message grouping application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the functionality of journal message grouping application 106 in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of journal message grouping application 106 in accordance with one embodiment of present invention can be implemented in a wide variety of computer system configurations. In addition, the functionality of journal message grouping application 106 could be stored as different modules in memories of different devices.

For example, journal message grouping application 106 could initially be stored in server computer system 130, and then as necessary, a portion of journal message grouping application 106 could be transferred to host computer system 102 and executed on host computer system 102. Consequently, part of the functionality of journal message grouping application 106 would be executed on processor 134 of server computer system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, journal message grouping application 106 is stored in memory 136 of server computer system 130. Journal message grouping application 106 is transferred over network 128 to memory 112 in host computer system 102. In this embodiment, network interface 138 and I/O interface 110 would include analog modems, digital modems, or a network interface card. If modems are used, network 128 includes a communications network, and journal message grouping application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer implemented method comprising:

querying an inbox of a journaling mailbox for a Journal Report listing of each journal report;

obtaining said Journal Report listing;

determining whether there is at least one journal report present in said Journal Report listing to be processed for identification; and wherein upon a determination that there is at least one journal report present in said Journal Report listing to be processed for identification, for each journal report in said Journal Report listing:

determining whether an Internet Message ID is present in a text body of said journal report;

wherein when said Internet Message ID is present, creating a custom message ID MAPI property on said journal report, said custom message ID MAPI property including said Internet Message ID as a custom message ID value, and modifying a message class value of a message class MAPI property value of said journal report to indicate said journal report is a journal part;

wherein upon a determination that there is not at least one journal report present in said Journal Report listing to be processed for identification, querying said journal mailbox for a Journal Part listing identifying journal parts in said inbox of said journal mailbox to be processed for grouping;

receiving said Journal Part listing;

setting a group eligible flag to true;

determining whether there is at least one journal part present in said Journal Part listing to group;

wherein upon a determination that there is at least one journal part present in said Journal Part listing to group, for each journal part in said Journal Part listing:

selecting a journal part in said Journal Part listing to process;

determining whether a custom message ID value of said journal part matches a previous custom message ID value;

wherein when said custom message ID value of said journal part matches said previous custom message ID value, determining if said group eligible flag is set to true;

wherein when said group eligible flag is set to true, determining whether a last modification time of said journal part is before a time threshold; and wherein when said last modification time of said journal part is before said time threshold, adding said journal part to a Current Set, identifying said journal part as a previous journal part, and determining whether there is a next journal part to group.

2. The computer implemented method of claim 1 wherein upon a determination that there is not at least one journal part present in said Journal Part listing to group, determining whether there is a journal part in a Current Set to process;

wherein upon a determination that there is not a journal part in a Current Set to process, determining whether there is a next journal part in said journal part listing to group;

wherein upon a determination that there is a next journal part in said journal part listing to group, setting said group eligible flag to true;

resetting said Current Set; and selecting a next journal part in said journal part listing to group.

3. The computer implemented method of claim 2 wherein upon a determination that there is a journal part in said Current Set to process, for each journal part in said Current Set:

modifying said message class value of said journal part to exclude said journal part from subsequent identification processing and subsequent grouping processing of said inbox;

selecting one journal part in said Current Set as a master copy; and creating on said master copy a custom related journal parts MAPI property including a related journal parts value, said related journal parts value identifying each of the other journal parts present in said Current Set.

4. The computer implemented method of claim 3 further comprising:

processing each said journal part in said Current Set in accordance with a selected method.

5. The computer implemented method of claim 1 wherein when said custom message ID value of said journal part does not match said previous custom message ID value, determining whether there is a journal part in a Current Set to process;

wherein upon a determination that there is not a journal part in a Current Set to process, determining whether there is a next journal part in said journal part listing to group;

wherein upon a determination that there is a next journal part in said journal part listing to group, setting said group eligible flag to true;

resetting said Current Set; and selecting a next journal part in said journal part listing to group.

6. The computer implemented method of claim 5 wherein upon a determination that there is a journal part in said Current Set to process, for each journal part in said Current Set:

modifying said message class value of said journal part to exclude said journal part from subsequent identification processing and subsequent grouping processing of said inbox;

selecting one journal part in said Current Set as a master copy; and creating on said master copy a custom related journal parts MAPI property including a related journal parts value, said related journal parts value identifying each of the other journal parts present in said Current Set.

7. The computer implemented method of claim 6 further comprising:

processing each said journal part in said Current Set in accordance with a selected method.

8. The computer implemented method of claim 1 wherein when said group eligible flag is not set to true, setting said group eligible flag to false;

resetting said Current Set; and determining whether there is a next journal part to group.

9. The computer implemented method of claim 1 wherein when said last modification time of said journal part is not before said time threshold, setting said group eligible flag to false;

resetting said Current Set; and determining whether there is a next journal part in said journal part listing to group.

* * * * *